United States Patent Office 2,991,481
Patented July 11, 1961

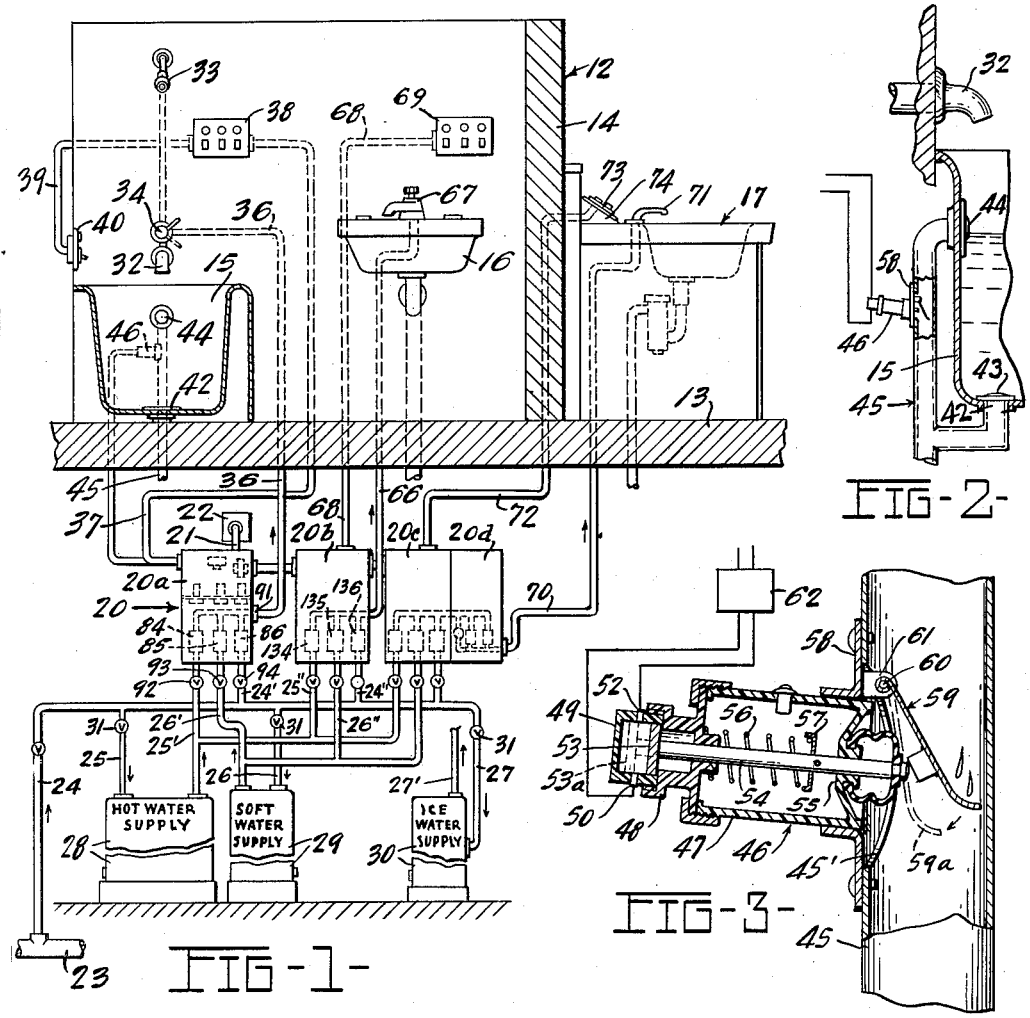

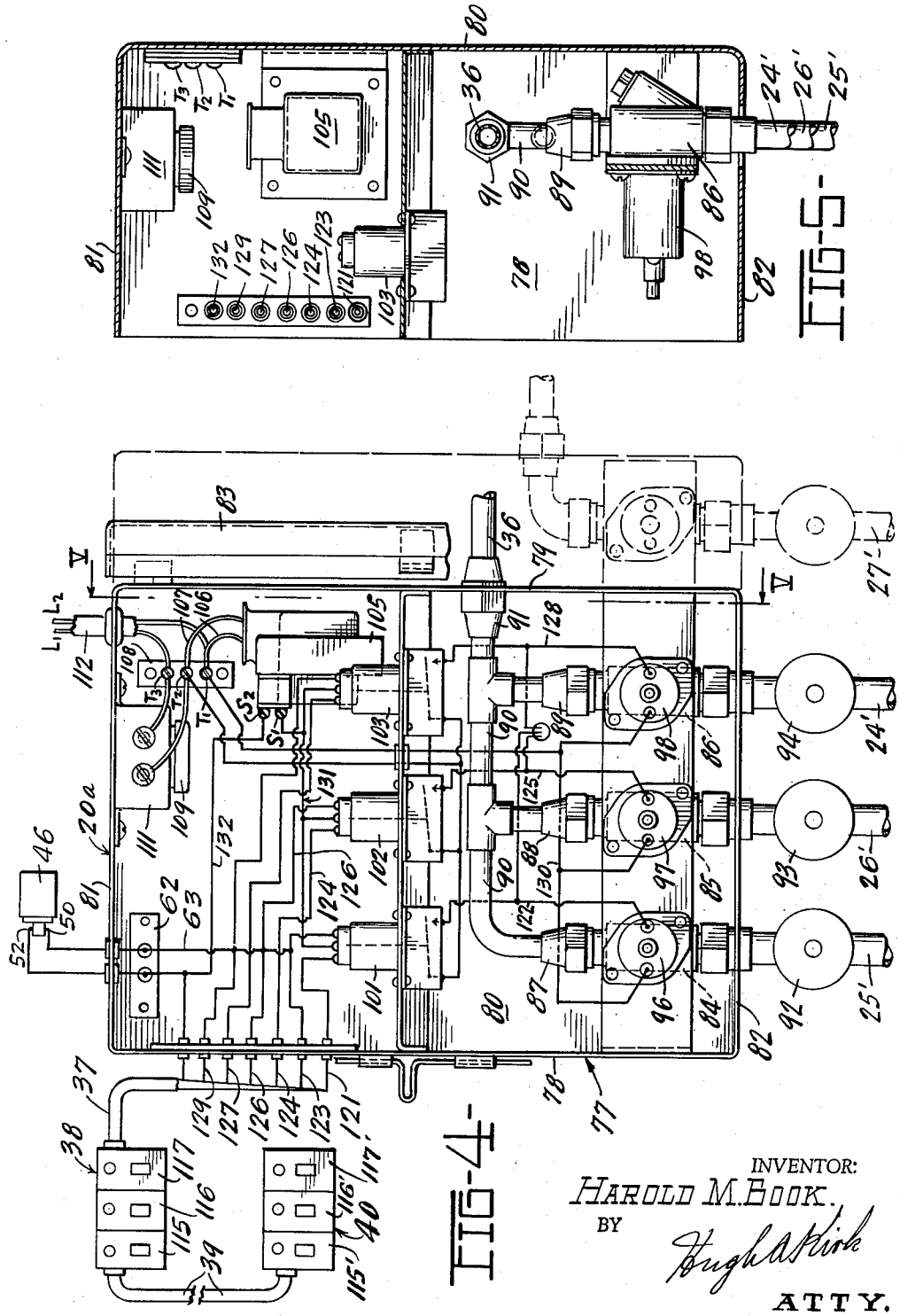

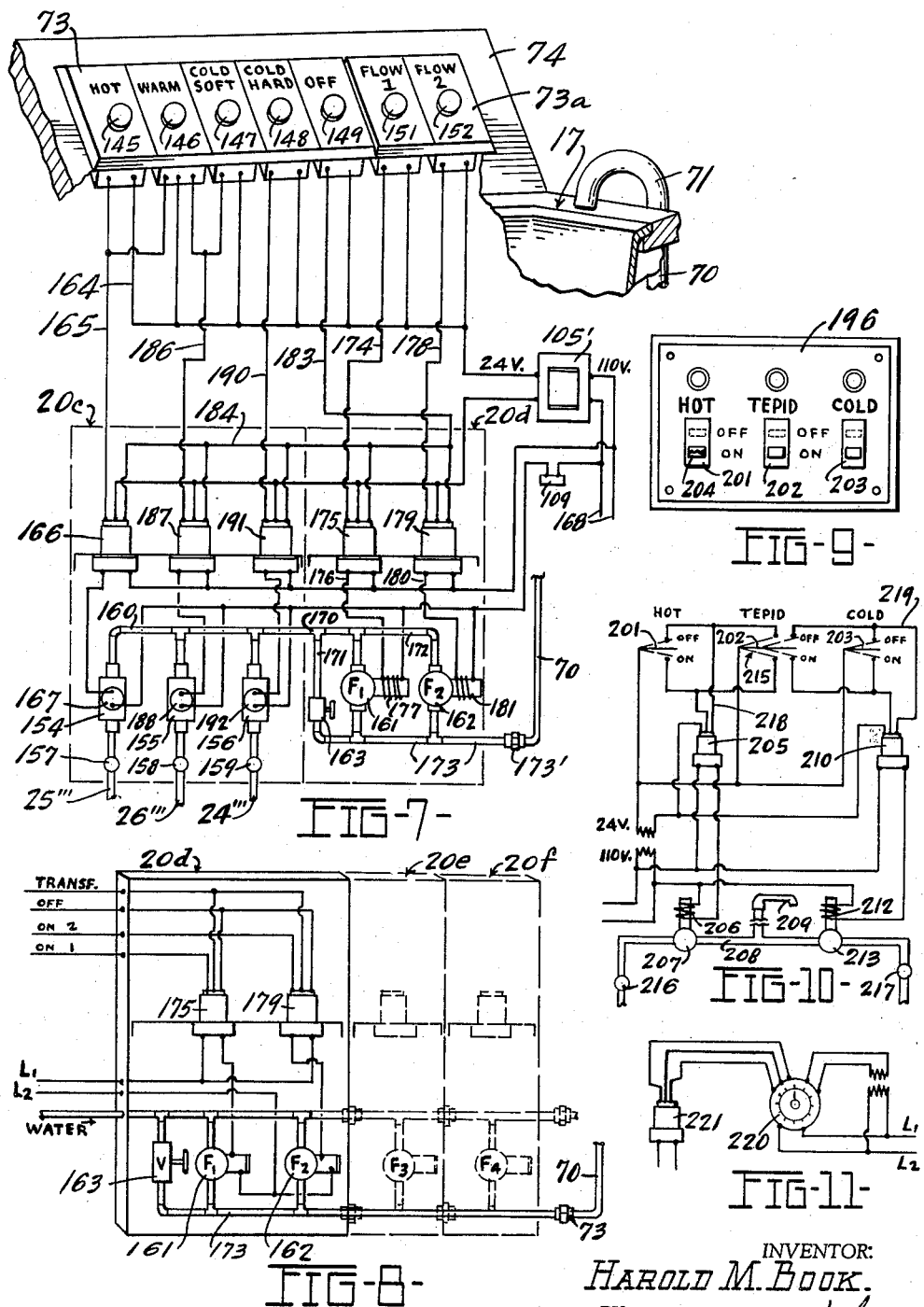

2,991,481
FLUID DISTRIBUTION CONTROL SYSTEM
Harold M. Book, Rte. 4, P.O. Box 366, Pleasant Township, Van Wert County, Ohio
Filed Mar. 17, 1958, Ser. No. 721,927
17 Claims. (Cl. 4—1)

This invention relates to systems for fluid distribution and to controls therefor. More particularly it deals with a system for distributing fluids, such as for example, a hot and cold water supply to various outlets such as may be found in a residence, office, hospital, house trailer, laundry or launderette, and to control the system electrically from remote points within or without the system.

In systems of this kind, electrically operated valves have been of limited use except perhaps in the more recent types of automatic washing machines in which pre-set time cycles may be used in a manner to control a wash period requiring extended use of hot water, then following with usually at least one rinse period involving the use of either warm water or cold water or both. The invention herein disclosed comprises a much larger field and may encompass applications such as lavatories, showers, kitchen sinks, drinking fountains, lawn sprinklers, and many other applications or adaptations which may be used with a remotely controlled fluid distribution system, and/or parts thereof.

It is an object of this invention to produce an efficient, simple, modern, effective and economic combined distribution and control system for fluids such as for example hot or cold water, and for soft, hard or ice water, etc.

It is also an object of this invention to provide a substantially unitary article of manufacture which may be installed in a residence, and with varying degrees of alteration thereto, may be connected into the existing fluid distributing equipment. Greater advantages however may be had in newly constructed homes where a push button control system such as herein disclosed would be both an economic benefit and an added convenience feature for the user.

Another object is to provide a valve means for fluids which may be remotely situated from the particular point of discharge of the fluid, thereby materially reducing the amount of piping and duct work required over previously known systems; as well as reducing heat losses from extended hot water lines, and/or the strength of the ducts because of the lower pressure existing therein.

Another object is to provide a means for controlling the operation of all the valves in the distribution system at a single location such as in a basement or service area from one or more points remotely located from both the valves and also, if desired, remote from the point of discharge of the fluid, thereby eliminating the faucets or valve spigots generally employed in lavatory bowls and tubs including their protruding obstructions and parts, as well as leaky valve joints in the lavatory.

Another object is to provide an electrical means to control the operation of the fluid distribution system, including the shutting off of all of the valves and distribution to one or all remote locations by a single touch of an operator's finger, and also if desired to provide a safety shutoff overflow switch in at least a part of the system.

Another object is to provide an electrical control means for the system which may be caused to operate after a certain predetermined lapse of time, or after a certain quantitative measurement of the flow of the fluid.

Still another object is to provide an electrical control system which may be used to control the distribution of fluids from a plurality of sources or supply channels for the purpose of mixing the fluid to obtain diverse pre-set characteristics of the mixed fluids, such as varying degrees of temperature between hot and cold fluids and varying degrees of flow thereof.

Still another object is to provide a low voltage electrical control for a fluid distribution system which will be safe for a user under either wet or dry conditions, for example, as when installed for use in washrooms, showers or bathtubs.

Generally speaking, this invention comprises a unit package or assembly for controlling a fluid system, such as the water system in a home, which package comprises an enclosure having a plurality of inlets for liquid ducts from different sources, a single outlet, a standard electric input cable adapted for connection to the electric power supply of a home, and a plurality of terminals for the connection of low voltage control circuits. This assembly or housing includes a manifold connecting each of the inlet ducts to the single outlet duct with an electrically controlled or solenoid valve in each of the inlet ducts before they join the manifold, and a low voltage relay to control each solenoid valve. The housing also may include a transformer (and fuse) for generating the low voltage for operating the relays and connection to the low voltage terminals in the housing.

The fluid system beyond the unit package or housing above mentioned, may include a plurality of sources of fluid or liquid which may be connected to each of the inlet ducts of the housing, which for example, may be hot water, cold water, hard water, and/or the like; and a single low pressure duct from the outlet of the housing to a remote point, such as a lavatory, basin, sink, tub or shower in a home, which duct or tube may be of relatively inexpensive material, such as light weight metal or plastic tubing, because it carries substantially no pressure and is not maintained with any of the pressures which normally occur at the sources connected to the inlet ducts of the housing.

Also connected to the housing and outside the housing are a plurality of low voltage switches and/or indicators which may be located adjacent the outlet of the low pressure duct from the manifold in the housing. These switches may be supplied with low voltage, of 24 volts or less, from the transformer in the housing, and are connected to the relays in the housing so that operation of any one of them will operate its corresponding relay and solenoid valve to cause one or more of the liquids to flow through the low pressure duct to its outlet at a sink, basin, lavatory, tub, or the like.

The low voltage control system may also include additional switches responsive to the overflow of the tub or basin for shutting off the valves in the housing, as well as safety switches which shut off the flow of all the valves by the mere instant touch or press of a button. One or more switches for a single outlet may be connected in parallel at different locations, such as for the outlet spout for filling the tub, one set of switches being at chest level of a person and the other being at a lower level which may be reached by the person when sitting in the bathtub. Another example for an additional switch is in a hot and cold water supply to have three switches, one of which is for hot, another for cold, and the third for operating both hot and cold water valves for warm or tepid temperature water. Furthermore, if desired, the control of the system or parts thereof may be under that of a time clock, employed for operating a sprinkler system for the lawn of the home, which may be operated only during the hours when the pressure in the city water mains is high, such as in the very early morning hours.

Combined with the assembly, package or housing of this invention, or as a separate assembly unit adjacent thereto, there may be provided a variable flow control device which comprises between the outlet of the manifold a plurality of parallel ducts to another outlet manifold, with valves in each parallel duct, which valves may be controlled by different apertures in their parallel ducts, so that as each one or more of the valves is opened a different amount of flow can be caused to pass from the pressure or source side of the device to the outlet duct to the spout at the basin, sink, lavatory, tub, or the like. For such a device, a corresponding plurality of push buttons for high, low, medium or other intermediate flows are provided adjacent the push buttons for controlling the fluid valves from the sources connected to this additional unit.

According to the system of this invention, each outlet, such as each basin, tub or sink, in a home requires only one low pressure duct to it, one spout outlet, one low voltage control push button switch panel, and one housing unit or assembly remote therefrom and preferably adjacent the sources of the liquid in the utility room or basement of the home. Thus, all the valves and control mechanisms are situated at one location and remote from the place where the liquids are to be used, thereby materially reducing the amount of plumbing and duct work required in a home.

The above mentioned and other features and objects of this invention and the manner of attaining them will become more apparent and the invention itself will be understood best by reference to the following description of embodiments of the invention taken in conjunction with the accompanying drawings, wherein:

FIG. 1 illustrates a portion in cutaway form of a residence having fixtures such as a bathtub, a kitchen sink, and a washstand, and connected therewith the hot, cold or soft water distribution control system according to one embodiment of this invention;

FIG. 2 is a vertical portion of a bathtub having water inlet and outlet connections and a safety shut-off control switch installed in an outlet connection of the tub;

FIG. 3 is a vertical section in more detail of the construction of the safety shut-off switch illustrated in FIG. 2;

FIG. 4 is an enlarged side view of one form of electrical control assembly unit or housing as shown in FIG. 1, with its door open showing the solenoid valves, relays, ducts, manifold, transformer, fuse, and electrical circuits;

FIG. 5 is a cross sectional view taken along line V—V on FIG. 4;

FIG. 6 is an enlarged plan view of one type of switch plate with a series of switch control buttons and indicator lights thereon that may be employed near a liquid outlet in the system of FIG. 1;

FIG. 7 is a schematic fluid flow and wiring diagram of another system of this invention, including a switch panel that may be mounted on the backboard of a kitchen sink, for controlling both qualitative and quantitative liquid flows;

FIG. 8 is a schematic diagram of the quantitative flow control portion of FIG. 7 showing how it can be adapted for further quantitative flow control by addition of separate flow control assemblies;

FIG. 9 is an enlarged plan view of another form of switch plate and a series of switch buttons thereon which may be employed in the system of this invention, one switch having a key slot to be operated only with insertion of a key;

FIG. 10 is a schematic wiring diagram of a part of the circuit shown in FIG. 7 or connected to the plate of FIG. 9, for mixing hot and cold water to obtain a warm water flow; and FIG. 11 is a schematic wiring diagram of a portion of control circuit utilizing a timer switch which may be adapted to control the duration of time that a valve in the system of this invention may be opened or closed.

(I) GENERAL ARRANGEMENT

Most residences and offices may have installed therein plumbing accessories or fixtures including bathtubs, wash basins, kitchen sinks, and other similar or related equipment. In the drawings accompanying this disclosure, there is shown (see FIG. 1) a portion of a residence 12 having a floor 13, a partition wall 14, and including various accessories such as a bathtub 15, wash basin 16, and kitchen sink 17 herein shown for convenience of illustration on opposite sides of the wall 14. These and/or other accessories also may be installed in remote or more widely separated areas either within or without a residence, and may still be within the purview of this invention. Furthermore the various devices may be operated from a group or bank of central control units 20 which may be positioned preferably near a supply source herein shown as being below the floor 13. Power inlet wires 21 from a source 22 may be provided to supply power to the various circuits of the control system to be hereinafter described.

Water under pressure may be supplied to the system from a water main 23 or from a source such as a pump, reservoir, or other means (not shown). The water may be conducted from the source 23 or to an inlet manifold 24 having branches 25, 26 and 27 which in turn may connect respectively to a hot water tank 28, soft water treatment tank 29, and/or ice water tank 30. Shut-off cocks 31 may be provided for controlling the supply of water from the supply pipe 24 to the branch lines 25, 26 and 27 through the various treatment tanks and thence to the system.

The tub 15 may be provided with a spout fitting 32 and a shower nozzle fitting 33 both of which may be connected by means of a diverter valve 34 to a branch line 36 leading to one of the control units 20 of the control system below the floor 13. It may be noted herein that a single low pressure, small diameter feed line 36 of a flexible nature, such as plastic tubing, may be employed to deliver water from the control system to the fittings associated with the tub 15.

The electrical system as related to the tub 15 includes a branch circuit 37 connected into one of the control units 20a of the control system, the conductor 37 being fed to a switch panel 38 on one wall near the shower nozzle 33 to be accessible for use when a user may be standing in the shower. A continuing circuit 39 may be brought to a switch panel 40 on another wall of the bathroom to be accessible to a person who may be seated in the tub 15. Either of the switch panels 38 or 40 may be used to control the flow of water to the spout 32 or the nozzle 33, the particular direction of flow depending on whether the diverter valve 34 is in "Shower" or "Tub" position. Thus the tub 15 may be filled by turning the diverter valve 34 to "Tub" position and pressing the desired switch buttons on the switch plate 38 while standing on the floor 13 outside the tub.

The tub 15 may also be provided with a drain opening 42, drain plug 43, overflow opening 44, and a combination overflow and drain pipe 45, for disposing of waste water from the tub. A safety off-switch 46 (FIGS. 2, 3) may be positioned within the drain pipe 45 as a precaution against continued flow of water into the tub 15 as for example, in case of a faulty valve action and possible overflow of water in the tub. This switch 46 may be constructed of a plastic body 47, a head portion 48 and a cap portion 49 all of plastic or similar material. Contact terminals 50 and 52 may be provided in the cap portion 49 and a conductor strip or disc 53 may be provided to momentarily close the circuit across terminals 50 and 52. The contact strip 53 may have a stem 54 projecting forwardly through the switch body 47 into the drain pipe 45 through a combined guide ferrule and moisture seal device 55 formed on the end of the body 47. A spring 56 normally bearing against a washer 57 fixed to the stem 54 may act to keep the contacts 50, 52 and disc 53 in a normally open non-conducting position. The body 47 may be provided with an attachment flange 58 adapted for mounting over an access opening 45' at the side of the drain pipe 45. A flap or vane 59 may be pivoted on a pin 60 fixed in ears 61 formed on the flange 58, and adapted for a free swinging motion within the drain pipe 45, the flap 59 normally bearing lightly against the end of stem 54 (see FIG. 3). Normally the spring 56 will keep the flap or vane 59 and stem 54 in its normal or full line position, so that when water overflows into the outlet 44 and downwardly into the drain pipe 45, the falling drops of water will impinge upon the flap 59 to swing it toward the dotted line position 59a, thus shifting the contact disc or strip 53 into momentary contact with the terminals 50 and 52 toward the dotted line position 53a, thereby at least momentarily closing a circuit to a terminal block 62 in the control panel 20a (see also FIG. 4) to conductor 63 to the "off" terminals of the control relays 101, 102, 103, to shut off the water to the tub 15. In the event of failure or other difficulties in the control system or through an oversight by the user, overflow of water into the drain pipe 45 will actuate the switch 46 to automatically shut off all the water supplies to the tub. Although the connection 63 is shown so that the operation of any push button switch 115, 116 or 117 to its "off" position will shut off all the water to duct 36, this can be changed by connecting separate conductors to each relay 101, 102 and 103 from separate switch contacts in switch 46 instead of the common conductor 63 shown.

The wash basin 16 may be provided with a feed line 66 carrying water from the control system 20b upwardly to the spout 67 for supplying water thereto. A switch plate 69 may be mounted in a convenient position over the wash basin 16, and may be connected to the control system 20b by means of a control conductor 68. Here again it may be seen that the single water conductor 66 may supply water to the wash basin 16 independently of the conductor 36 to the tub. The kitchen sink 17 may be supplied similarly from the control system 20c through a branch distribution line 70 which leads upwardly from the control system to a spout 71 for supplying water to the sink. A circuit conductor 72 may be provided to connect the control system 20 to a switch plate 73 which may be mounted on a splashboard 74 of the sink 17.

From the foregoing it may be seen that there is provided an electrical switching means for controlling the supply of water for use in a tub, wash basin or kitchen sink; the water being supplied through individual delivery conduits to each appliance from a series of electrically operated valves in the control system 20 and that other appliances or combinations of appliances or accessories may be included or combined in such an arrangement.

(II) THE CONTROL SYSTEM (1) *Three separate fluid sources*

The control system 20 may be designed to include all of the necessary valves, pipes and electrical means for controlling the delivery of water at a pre-selected temperature such as hot, tepid, or cold, besides soft water or ice water or other types of water, any or all of which may be directed to certain of the various accessories, fixtures and/or appliances, outdoor sprinklers, etc., which may be included in an installation such as herein described.

The central part of his type of system may comprise a package type assembly or control box 77 (see FIG. 4) having side walls 78, 79, rear wall member 80, top and bottom members 81, 82, respectively, and a hinged door or cover 83 (partly broken away for clarity) adapted to enclose the control apparatus within the control box 77.

A series of one way valves 84, 85, 86, having inlet valve connections 92, 93, 94, respectively from a hot water pipe 25' (see FIGS. 1 and 4), cold soft water supply pipe 26', and cold hard water supply pipe 24', may also have pipe discharge connections 87, 88, 89 respectively into a common manifold or duct 90, and union fitting 91 for connection with the outlet pipe 36, then to the diverter valve 34 and fixtures 32, 33 on or over the tub 15. The inlet valves 92, 93, 94 may be provided in the lines 25', 26', 24' for regulating or presetting the pressurized fluid supply to the control system and consequent discharge volume from the outlets. The electrically operated valves 84, 85, 86 may be provided with solenoids 96, 97, 98 adapted to control the open and closed positions of their respective valves, and thereby permit a selective flow of fluid into the pipe 36. The solenoids 96, 97, 98 may be interconnected with a series of impulse type relays 101, 102, 103 for controlling the supply of electrical current to the respective solenoids, and consequent control of the flow of fluid through the system.

While the solenoids 96, 97, 98 may be operated from a standard 110 volt A.C. source, the switching circuits may desirably and advantageously be operated from a reduced voltage source of a more nearly if not completely harmless degree. For this purpose there may be provided a transformer 105 having lead-in wires 106, 107 which may be connected through terminals T1, T2 on a terminal block 108, a fuse plug 109 in a fuse block 111, and a terminal T3 to a power supply line 112. The transformer 105 preferably may have a 110 volt to 24 volt or less ratio, in order to obtain a non-injurious or substantially harmless voltage in the push button control system.

The transformer 105 may have secondary terminals S1 and S2 for supplying a low voltage current to the various switch buttons and the aforesaid impulse type of polarized relays 101, 102, 103 comprised in the system; the contactor side of the relays however being rated for standard 110 volt service to correspond with the requirements for the solenoids 96, 97, 98 for operating the valves 84, 85, 86, respectively. Other voltage requirements of course necessitate corresponding changes in the choice of solenoids, contactors, and associated devices if required in the system.

One means of controlling the distribution of water in the system disclosed herein may embrace a switch panel 38 (see FIGS. 1 and 6) having a series of "on-off" buttons 115, 116, 117 and corresponding signal lights 118, 119, 120, respectively designated "hot," "cold-soft," and "cold-hard"; the designations meaning that hot water, cold soft water, and/or cold hard water may be caused to flow when their respective switch buttons are operated. The switch buttons may be of the type where momentary contact is made so that if for example, switch 115 is pressed to its "on" position, the circuit 121 to relay 101 may be closed momentarily, to in turn close the circuit 122 to solenoid 96 to open the hot water valve 84 in the system.

In this manner hot water may be caused to flow from the source lines 23, 24, pipe connections 25, to the hot water supply tank 28, under pressure to the inlet pipe 25', to the control unit 20a and solenoid valve 84 mounted therein, thence through manifold pipe 90, union connection 91, and branch line 36 for distribution to either the discharge spout 32 on the tub 15, or to the shower nozzle 33 above the tub, depending on the direction of the setting of the diverter valve 34. Hot water then may continue to flow until the switch button 115 is pressed to its "off" position at which time a similar momentary current impulse in the line 123 to the relay 101 will break the circuit 122 and will release the solenoid 96 on the valve 84 to allow spring or gravity return of the valve core to its closed position and shut off the flow of hot water through the line 36 and outlets 32 and 33.

Cold soft water and cold hard water also may be controlled in a similar manner. For example, a switch button 116 may have an "on-off" connection 124 with the relay 102 which in turn may have an operational connection 125 with the solenoid 97 for controlling the flow of cold soft water from the soft water supply tank 29, which also may be under pressure, through the inlet pipe 26', into the control unit 20a and to the solenoid valve 85 mounted therein, thence through manifold pipe 90, and branch line 36 for distribution to the outlets 32 and 33 to the tub 15. Pushing the switch 116 to "off" will close the circuit 126 to the relay 102 which in turn will release the solenoid 97 on the valve 85 to allow a spring or other means to return the valve core to closed position and thus close the valve 85 and stop the flow of water from the line 26' into the manifold 90.

The cold-hard water supply may be controlled by means of switch 117 which acts in a manner similar to the switches 115, 116. The switch 117 may be connected through a circuit 127 to the relay 103 for the purpose of closing a connection 128 to the solenoid 98 for controlling the flow of cold-hard water from the supply pipe 24 and inlet pipe 24' into the control unit 20a and to the solenoid valve 86 mounted therein, thence through the manifold pipe 90 and branch line 36 of the system. A current conductor 129 may be provided from the "off" position of the switch 117 to the relay 103 which will open the connection 128 to the solenoid 98 and thereby allow the valve 86 to close and stop the flow of water through the connection 89 to the branch line 36 of the system.

A common current conductor 130 may be provided for the connection for the solenoids 96, 97, 98 from a 110 volt supply line. A similar common conductor 131 may be provided for the relays 101, 102, 103, at 24 volts approximately, the latter being connected to the secondary terminal S1 on the transformer 105, the circuit being completed by a line 132 to connect the common terminals of the switches in the panel 38 to the secondary terminal S2 of the transformer 105. Also shown in FIG. 4 is the previously mentioned tub overflow switch 46 and its connections to energize the "off" positions of all three relays 101, 102 and 103 when it is operated by overflow through the outlet 44.

The extension line 39 and auxiliary switch panel 40 may be interconnected in the control system, the buttons on the panel 40 being similar and substantially identical with the buttons of panel 38 so that control of the system may be had from a standing position either out of or in the tub, or from a sitting position while in the tub. In other words the tub 15 may be at least partially filled with water by first maniuplating the switches on the panel 38 from a position outside the tub, then adjusting or shutting off or adding water to the tub after being seated therein by manipulating the switches on the panel 40. Thus, there has been provided a simple, new and modern means for controlling the filling of a tub, necessitating merely a push button effort for operating the control system as disclosed herein; the control system being readily adaptable to other arrangements and groupings of elements as may be hereinafter described.

The lavatory or wash basin 16 in FIG. 1 may be supplied in a similar manner, the control however being centered in the switch panel 69 with its low voltage electric control conductors 68 being connected to the control unit 20b of the assembly 20 as mentioned above. A series of valves 134, 135, 136 may be arranged in the control unit 20b to have inlet connections respectively from a hot water supply pipe 25'', cold-soft water supply pipe 26'', and cold-hard water supply pipe 24''. In this manner the connections to the tub 15 and the lavatory 16 may be substantially identical and water of selected temperatures or other characteristics may be drawn by mere pushing of a switch button adjacent the tub or lavatory.

(2) Variable flow

Another means for remotely controlling the supply of a plurality of fluids and their relative volumes of flow which may be discharged from an outlet, such as the spout 71, may comprise the switch panels 73, 73a, hereinbefore described as being mounted on splashboard 74 of a kitchen sink 17 (see FIGS. 1, 7). The switch panel 73 may include a series of switch buttons, as for example hot water 145; warm or tepid water 146; cold soft water 147; cold hard water 148; and shut off 149.

Additionally on the sub-panel 73a there may be provided a plurality of auxiliary switch buttons 151, 152 for controlling a similar number of flow control switches and associated solenoid operated regulating valves adapted to permit various rates of discharge from the spout 71.

For this purpose there may be provided a control box 20c of a type similar to the box 77 wherein there may be provided a series of valves 154, 155, 156 having inlet valve connections 157, 158, 159 respectively from the hot water supply pipe 25''', cold soft water supply pipe 26''', and cold hard water supply pipe 24''', leading to a common manifold or duct 160. The regulation of the flow of fluid at this stage may be substantially identical with that of the control for fluid flow to the tub 15 or to the wash basin 16. However, a variable degree of flow may be obtained from the system by providing an auxiliary control box 20d having auxiliary flow control valves 161, 162, 163 mounted therein. These valves may be selected or adjusted to deliver for example; one quarter flow, one half flow, three fourths flow, or four fourths of full flow from the duct 160 and into duct 70 to the spout 71 at the sink 17.

The circuits for the above described control or operating arrangement may be provided, for example, as follows: the hot water switch 145 may have a conductor 164 leading to a low voltage terminal of a transformer 105' (or the transformer 105), and may also have a connection 165 leading to a relay 166 which may in turn energize a solenoid 167 on the valve 154 to cause opening thereof thus permitting water to flow from the supply pipe 25''' into the manifold 160. The solenoid 167 is connected to the 110 volt circuit 168, as with the solenoids 96, 97, 98 in the panel 20a.

The manifold 160 may be connected into the auxiliary flow control unit or box 20d through a T-fitting 170 having a branch outlet pipe 171 leading to the valve 163 adapted for manual adjustment to the minimum, such as a quarter flow capacity setting of the unit. The valves 161, 162 then may be set for another quarter and a half flow capacity respectively, and be connected in a parallel arrangement on a manifold, or header 172 also on to the T-fitting 170. Another manifold or header 173 and union fitting 173' may be provided for connecting the above valves 163, 161, 162 to the duct 70 and spout 71 on the sink 17. Varying rates of flow of fluid may be obtained by selectively operating the switch buttons on the panels 73 and 73a, as for example: by pushing the switch 145, the relay 166 will be operated to close a circuit to solenoid 167, thus opening the valve 154 to permit flow of hot water through the manifold 160, T-connection 170, and interconnected pipes 171, 172. With the manual valve 163 open to quarter capacity, fluid will flow at that rate through the manifold 173 and duct 70 for delivery to the spout 71.

In order to obtain half capacity flow, the switch 151 (F1) may be operated thereby closing circuit 174 to a relay 175 which in turn closes a circuit 176 on a solenoid 177 to open the valve 161 and permit flow of fluid therethrough; the valve 161 having been previously set to permit one fourth capacity flow. As flow is thus initiated through the valve 161, the amount of fluid therethrough will be in addition to that of the manual valve 163, which also is set to flow at a rate of one fourth the capacity of the unit, so that the simultaneous flow from both valves 163 and 161 will deliver substantially half the capacity of flow of the unit to the duct 70 and out through the spout 71.

Likewise switch button 152 (F2) may be operated to close a circuit 178 to a relay 179 which then may close a circuit 180 to energize the solenoid 181 on the valve 162 to permit the flow of fluid through the valve 162 and into the manifold 173 for delivery to the duct 70 and its outlet spout 71. The valve 162 may have been previously calibrated to permit substantially half the flow capacity of the unit; which when combined with the flow from the valve 163 having one fourth fluid flow capacity, may total substantially three fourths of the flow capacity of the unit.

Both of the switches 151 (F1) and 152 (F2) may be operated simultaneously to energize the solenoids 177 and 181 thus opening both valves 161 and 162 to permit three fourths capacity flow therethrough. The valve 163 which may normally be in its fourth open position, may then combine with the valves 161 and 162 to total substantially four fourths or the total flow capacity of the unit.

In order to shut off the flow of fluid from any and all of the units of this system, there is provided a common shut-off switch 149, the circuit for which is through a conductor 183 to a common conductor 184 to the "off" terminal of all of the relays 166, 187, 191, 175 and 179.

In addition to the flow control panel 20d there may also be provided similar flow control panels or units 20e and/or 20f (see FIG. 8), which may be added to obtain a finer degree or steps of volumetric control by valves F3 and F4 for the flow of fluids through the system.

Cold soft water may be obtained by operating the switch button 147 which may be connected through the line 186 and relay 187 to energize the solenoid 188 on the valve 155. The cold soft water may be thus permitted to flow from the pipe 26''' through the solenoid operated valve 155 and manifold pipe 160 thence into the T-fitting 170 and fluid flow control valves 161, 162, 163 to the pipe 173 and duct 70.

Cold hard water may be obtained from duct 24''' by operating the switch button 148 which may be connected through a line 190 to a relay 191 which in turn may control the circuit to a solenoid 192 on the valve 156. Thus, different selections or varieties of fluids may be caused to flow into the manifold 160 by means of the switch buttons 145, 147 and 148; and that the volume flow of these selections may be further controlled by pressing the switches 151 and/or 152.

*(3) Mixed flow*

On switch button panel 73 there may be also provided a warm or tepid water switch 146, for effecting a warm water supply by mixing both hot water and cold soft water supplies, by jointly operating the relays separately operated by the hot water switch 145 and the cold soft water switch 147. Thus, by pressing the switch 146, both relays 166 and 187 and their respective solenoids 167, 188 may be operated to cause simultaneous opening of the valves 154, 155, which results in mixing the flow of water from the hot water pipe 25''' and cold soft water pipe 26''' in the manifold 160 for ultimate delivery through the duct 70 to the spout 71.

Another embodiment of a mixing or tepid water flow control is shown in FIGS. 9 and 10 in which a switch panel 196 having designations thereon, such as for example, "Hot," "Tepid" and "Cold," may be used for selectively controlling the flow of mixed or unmixed hot and cold fluids by means of off-on switch buttons 201, 202, 203, similar to those shown in FIGS 4 and 6. If desired, a key slot 204 may be provided in the switch 201 as a precaution against wanton use of this switch, and consequent waste of hot water or injury to one not familiar with the operation or function of the control elements.

A wiring diagram of a circuit controlled by the switch panel 196 may be observed in FIG. 10, wherein the hot water switch 201 (similar to switch 145) may be connected through a low voltage (24 volts) secondary transformer circuit to a relay 205 (similar to relay 166) which in turn controls the operation of a solenoid 206 (similar to solenoid 167) for controlling the flow of hot water through a hot water valve 207 (similar to valve 154) for conveying hot water to a manifold 208 (similar to manifold 160) and thence to an outlet spout 209 (similar to spout 71) or other means for consumption connected thereto. The cold water switch 203 (similar to switch 147) may be connected in a similar manner through the 24 volt secondary circuit to a relay 210 (similar to relay 191) which in turn controls the operation of a solenoid 212 (similar to solenoid 192) for controlling the flow of cold water through a cold water valve 213 (similar to valve 156) for conveying cold water to the manifold 208 and outlet spout 209 as above.

In order to obtain warm or tepid water, the switch button 202 may be connected into the control circuit to operate a double-pole double throw switch 215 for the purpose of interconnecting the relays 205 and 210 to thereby energize both the solenoids 206 and 212, thus opening both the valves 207 and 213 together and permitting flow of hot and cold water simultaneously into the manifold 208, to be discharged in a mixed form as tepid water from the spout 209. Manual control valves 216 and 217 may be provided in the supply pipes for initially adjusting the hot and cold flow rates to obtain a desired tepid temperature of water from the single spout 209 when only the push-button switch 202 is operated. Instead of having an "off" switch 149, the flow of fluid may be stopped by operating the "on-off" button 201, 202 or 203 into its "off" position which causes an impulse current to be passed into an oppositely acting coil in the relays 205, 205 and 210, or 210 through separate circuits for 218 and 219 to cause the polarized relays 205 and/or 210 to open their contacts to the respective solenoids 206 and 212.

(III) AUXILIARY FEATURES

It may be desirable to operate the control system or at least a certain particular part or portion thereof independently of another portion, and at a certain regulated or pre-determined time interval, such as for example, to fill a tube for a morning bath. For this purpose there may be provided a timer 220 (see FIG. 11), which may be connected into a standard 110 volt supply conductor L1, L2, to operate a relay 221 for operating the relays 205 and 210 for both initiating and shutting off the flow of tepid water for and at pre-determined times to the tub 15 (see FIG. 1). This arrangement or timer 220 also may be connected to control any of the other installed relays by being connected in parallel to the connections to their input terminals or it may be used for controlling the operation of a lawn sprinkler, an ornamental fountain, or other device or devices as desired without departing from the scope of this invention.

Although there are disclosed several different embodiments of this invention and different means of controlling the system thereof, it should be understood that any one of the features shown in any embodiment may be interchanged with that of another embodiment without departing from the scope of this invention, such as for example, that of employment of key operated switches such as 204 in FIG. 9 in place of any one of the switches shown on any one of the control panels; that instead of the on-off switches shown for controlling the tub 15 and basin 16 in FIG. 1, push buttons with a common "off" switch such as shown in panel 73 of FIG. 7 may be employed instead; and similarly on-off switches may be employed instead of the push button switches shown in panel 73. Furthermore if desired, the overflow switch may be employed for the basin 16 and/or sink 17, similar to that employed in the drain pipe 45 for the tub 15, which overflow switch 46 may be connected to shut off any one or all of the valves permitting the flow of fluid to that particular basin or sink. Although indicator lights are shown in combination with the on-off switches of the control panel in FIG. 6, these may be eliminated without departing from the scope of this invention, or they may be installed in combination with the push button switches shown in panel 73 and 73a, as desired. Again more than one control panel may be provided for a given outlet, such as the panels 38 and 40 disclosed for the tub 15 in FIGS. 1 and 4, or more remotely located control switch panels may be provided, as desired, without departing from the scope of this invention.

While there is described above the principles of this invention in connection with specific apparatus, it is to be clearly understood that this description is made only by way of example and not as a limitation to the scope of this invention.

What is claimed is:

1. A unitized remote-control fluid distribution system having a plurality of fluid sources and a fluid outlet; a fluid control assembly adjacent said sources and remote from said outlet and having a separate inlet duct connected to each source, a single outlet duct connected to said fluid outlet remote from said assembly, a manifold connecting said inlet ducts to said outlet duct, and a solenoid valve in each said inlet duct; a source of electricity of a given voltage and an electrical circuit control means connected to said electricity source, said control means comprising: means for producing a voltage of 24 volts or less, switches near said fluid outlet, and conductors connecting said voltage producing means and said switches to said assembly for controlling said solenoid valves.

2. A system according to claim 1 wherein said single outlet duct comprises a low pressure flexible tubing.

3. A system according to claim 1 wherein said solenoid valves include relays in said assembly, and said conductors from said switches are connected to operate said relays.

4. A system according to claim 3 wherein said voltage producing means and said conductors supply a lower voltage for operating said relays than for operating said solenoid valves.

5. A system according to claim 1 wherein each one of said switches is a single impulse push button switch, and said switches include a separate "Off" switch.

6. A system according to claim 1 including a plurality of interconnected sets of said switches for controlling said solenoid valves from a plurality of different locations.

7. A system according to claim 1 wherein said voltage producing means comprises a transformer.

8. A unitized remote control fluid distribution system having a plurality of fluid sources and a fluid outlet; a fluid control assembly adjacent said sources and remote from said outlet and having a separate inlet duct connected to each source, a single outlet duct connected to said fluid outlet remote from said assembly, a manifold connecting said inlet ducts to said outlet duct, a relay controlled solenoid valve in each inlet duct, and an electrical circuit control means for said solenoid valves comprising switches near said outlet and conductors connecting said switches to said relay controlled valves in said assembly.

9. A system according to claim 8 wherein said assembly includes a transformer and an electric power connection thereto for supplying low voltage current of 24 volts or less between said switches and said relays controlling said solenoid valves.

10. A system according to claim 8 including a timing mechanism connected to said circuit control means for controlling the time at which fluid will flow through said system and the duration of said flow.

11. In a fluid distribution system including a cold water supply main, a hot water tank connected through said cold water supply means, and a plurality of water outlets such as sinks, bathtubs, basins, and the like remote from said water main and said tank, means for supplying hot and cold water to said outlets comprising a single water carrying pipe extending from the tank and the water main to each of said outlets, a hot water shut-off valve connected to said hot water tank and a cold water shut-off valve connected to said cold water main, each of said carrying pipes being connected to said hot and cold water valves whereby to receive hot water when the hot water valve is open and whereby to receive cold water when the cold water valve is opened, electro-magnetic actuating means directly connected to each of said valves and operable to open said valve upon energization of said electro-magnetic actuating means, means for closing each of said valves upon de-energization of said actuating means, a power supply source, current conductors connected to each of said electro-magnetic actuating means and to said power supply source, and switch means in certain of said conductors operable to break the circuit between said actuating means and said power source whereby to control said valves.

12. A fluid distribution system having a plurality of fluid sources and a fluid outlet; a fluid control assembly adjacent said sources and having a separate inlet duct connected to each source, an outlet duct connected to said fluid outlet remote from said assembly, a manifold in said assembly connecting said inlet ducts to said outlet duct, an electrically operated and controlled valve means in each inlet duct in said assembly, a flow regulating means in said outlet duct in said assembly and comprising a plurality of parallel ducts and an additional electrically operated valve means in at least one of said parallel ducts; and an electrical circuit control means for operating all of said electrically operated valve means comprising switches near said fluid outlet and conductors for connecting said switches to said assembly 13. A fluid control assembly, comprising: a plurality of fluid inlet ducts, a manifold connecting all of said inlet ducts to a single outlet duct, said outlet duct extending from said manifold to a remote point, an outlet in said outlet duct at said remote point, a plurality of solenoid valves in each of said inlet ducts, a corresponding plurality of relays for controlling the operation of said plurality of solenoid valves in said inlet ducts, at least a corresponding plurality of switches near said outlet for controlling said relays, an electric power supply connection, a transformer connected to said power connection, said solenoid valves being connected to said power connection through contacts operated by said relays, and a voltage control circuit supplying power of 24 volts or less from said transformer for selectively operating said relays to operate said solenoid valves.

14. A system according to claim 13 including auxiliary flow control means in said outlet duct comprising a plurality of parallel flow ducts, valves in each of said parallel ducts, at least one of said parallel ducts containing a pre-adjusted flow regulating valve, solenoid operated valves in the other of said parallel ducts, separate individual push button switches located at said remote point for controlling the operation of said solenoid operated valves in said parallel ducts, whereby the quantity of flow at said remote point may be varied.

15. In a fluid distribution system having a source of fluid under pressure, at least one fluid treatment element attached to said source, individual pressure reducing valve means controlling the discharge from said source and said treatment element, a manifold to receive fluid from said individual valve means, and a single outlet duct connected to said manifold leading to a remote point for delivery of said fluid, the improvement comprising: individual solenoid means for operating said individual valve means, an electrical power source for powering said solenoids, individual push button switches located near said remote point, individual relays controlled by said push button switches to operate said solenoids, and a transformer means connected to said electrical power source for producing a lower voltage power supply for distribution to said push button switches and operating said relays than that supplied for operating said solenoids.

16. A variable flow fluid distribution system having a fluid inlet duct, a fluid outlet duct, and a plurality of parallel ducts between said inlet and said outlet ducts, a valve in each of said parallel ducts, one of said valves being pre-set to a given minimum flow rate through its corresponding duct and the other of said valves being electrically operated valves; and an electrical circuit control means for said electrically operated valves comprising: means for producing voltage of 24 volts or less, switches adjacent the fluid outlet of said outlet duct remote from said valves, relays for operating said electrically operated valves, and conductors connecting said voltage producing means to said switches and to said relays.

17. A system according to claim 16 wherein said electrically operated valves include means for predetermining the flow quantities of fluid to pass through their corresponding parallel ducts, whereby any one or combination of said parallel ducts may give different flows through said outlet duct.

References Cited in the file of this patent

UNITED STATES PATENTS

| | | |
|---|---|---|
| 802,949 | Waterman | Oct. 24, 1905 |
| 802,953 | Waterman | Oct. 24, 1905 |
| 1,417,770 | Schaefer | May 30, 1922 |
| 1,535,360 | Vickery | Apr. 28, 1925 |
| 1,987,883 | White | Jan. 15, 1935 |
| 2,146,930 | Bassett | Feb. 14, 1939 |
| 2,169,043 | Goehring | Aug. 8, 1939 |
| 2,305,154 | Gilbert | Dec. 15, 1942 |
| 2,402,280 | Green | June 18, 1946 |
| 2,434,353 | Edwards | Jan. 13, 1948 |
| 2,492,913 | Bailey | Dec. 22, 1949 |
| 2,526,039 | Oakes | Oct. 17, 1950 |
| 2,542,279 | Kempton | Feb. 20, 1951 |
| 2,877,467 | Cloud | Mar. 17, 1959 |